(12) United States Patent
Khafizov et al.

(10) Patent No.: US 11,924,778 B2
(45) Date of Patent: Mar. 5, 2024

(54) METHOD AND APPARATUS FOR OPTIMIZING RAN POWER CONSUMPTION

(71) Applicant: Verizon Patent and Licensing Inc., Basking Ridge, NJ (US)

(72) Inventors: Farid Khafizov, Plano, TX (US); Mark Ernest Newbury, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 304 days.

(21) Appl. No.: 17/526,515

(22) Filed: Nov. 15, 2021

(65) Prior Publication Data

US 2023/0156620 A1 May 18, 2023

(51) Int. Cl.
| | |
|---|---|
| *H04B 7/00* | (2006.01) |
| *G06N 5/04* | (2023.01) |
| *H04L 41/147* | (2022.01) |
| *H04W 24/08* | (2009.01) |
| *H04W 52/26* | (2009.01) |

(52) U.S. Cl.
CPC ............ *H04W 52/265* (2013.01); *G06N 5/04* (2013.01); *H04L 41/147* (2013.01); *H04W 24/08* (2013.01)

(58) Field of Classification Search
CPC .......... H04W 52/265; H04W 52/0253; H04W 52/0219; H04W 52/0238; H04W 52/223; H04W 28/0221; H04L 41/145; H04L 41/147
See application file for complete search history.

(56) References Cited

U.S. PATENT DOCUMENTS

| | | | | |
|---|---|---|---|---|
| 6,496,697 | B2 * | 12/2002 | Jensen .................. | H04W 16/18 455/67.11 |
| 7,676,731 | B2 * | 3/2010 | Moon .................... | H04L 1/1893 714/751 |
| 2010/0273488 | A1 * | 10/2010 | Kim ....................... | H04W 24/10 455/436 |

* cited by examiner

*Primary Examiner* — Tuan Pham

(57) ABSTRACT

Systems and methods may optimize power consumption for RAN devices. A device obtains field data of user equipment (UE) devices for a group of cells during a time interval. The field data includes signal strength measurements. The device computes cell boundaries for each cell based on the field data and predicts signal strength values inside each of the cell boundaries for a future time period. The device computes a cumulative overlap feature and a weighted signal strength feature for each cell of the group of cells during the future time period and generates an energy consumption predictive model that applies the cumulative overlap feature and the weighted signal strength feature for the future time period. The device determines, based on the energy consumption predictive model, optimal cell boundaries that correspond to a reduced energy consumption needed to meet service requirements during the future time period.

20 Claims, 11 Drawing Sheets

| c\c | 1 | 2 | 3 | 4 | 5 | 6 | cum |
|---|---|---|---|---|---|---|---|
| 1 | 0 | 9.1 | 0 | 10.2 | 74 | 16 | 109.3 |
| 2 | 13.1 | 0 | 20.1 | 14 | 48 | 0 | 95.2 |
| 3 | 0 | 22.3 | 0 | 24 | 0 | 7.2 | 53.5 |
| 4 | 11.5 | 10.3 | 16 | 6.7 | 6 | 65.1 | 108.9 |
| 5 | 65 | 36 | 0 | 78 | 0 | 3 | 110.7 |
| 6 | 27.4 | 0 | 4.8 | | 3.2 | 0 | 113.4 |

METHOD AND APPARATUS FOR OPTIMIZING RAN POWER CONSUMPTION

BACKGROUND INFORMATION

Development and design of radio access networks (RANs) present certain challenges from a network-side perspective, including increased power consumption of RAN components. A wireless network (which may include a RAN) is a complex system with many parameters and performance indicators that must be taken into consideration. One of the operational goals for any network operator is to control energy consumption in the network. Typically, wireless cell sites for the RAN, also referred to as base stations or access stations, are turned on and consume full power to provide constant availability of service for wireless customers.

DETAILED DESCRIPTION OF EXAMPLE EMBODIMENTS

Figure 1:
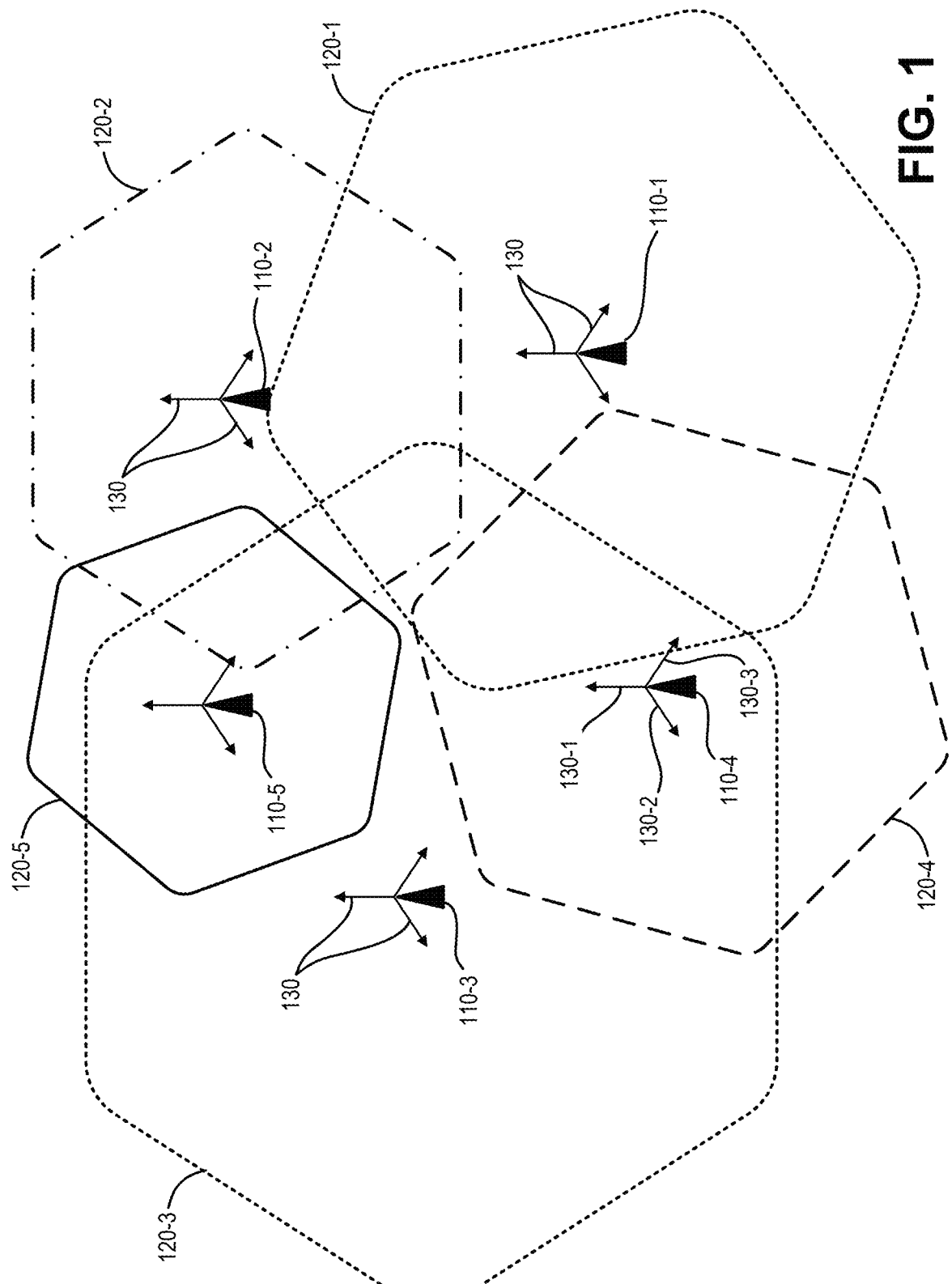
FIG. 1 is a diagram illustrating concepts described herein.

The following detailed description refers to the accompanying drawings. The same reference numbers in different drawings identify the same or similar elements.

Management of a network, such as a large-scale network, may involve understanding the interrelationship between network resources, other structures, and geographic locations. For example, a radio access network (RAN), such as a Fourth Generation (4G) RAN or a Fifth Generation (5G) RAN includes various RAN devices deployed at various geographic locations. Each RAN device (e.g., a base station) typically uses multiple carrier frequencies. For example, a single RAN device may provide coverage over an area referred to as a cell. A cell typically uses multiple carrier frequencies to meet capacity demands and provide guaranteed service quality within each cell, although not all carrier frequencies are typically applied on every cell. A cell may be divided into one or more sectors, with each sector providing different areas of coverage that may overlap. A particular sector may also transmit and/or receive signals on one or more predefined carrier frequencies. A particular carrier frequency in a particular sector may be referred to herein as a "sector-carrier." However, to simplify description herein, the terms, sector, sector-carrier, and cell may be used interchangeably.

Controlling energy consumption in a network is desirable both from the perspective of saving operational costs as well as reducing the carbon footprint of the network. Although some savings can be obtained via progressively more-efficient electrical equipment (e.g., tower site amplifiers that use power more efficiently), more considerable savings are available through full or partial shutdown of cell sites that are not essential to current performance. In this strategy, cell sites that are currently supporting little to no traffic can be (temporarily) shut down, reaping savings by eliminating the energy that is required from the transmission of control and traffic signals. This process of temporarily shutting down cell sites is uncommon, as successful implementation of this strategy is extremely complex and poses risks. For example, any shutdown can potentially negatively impact network performance (e.g., coverage), impacting user experience in unacceptable ways. The difficulty of predicting this impact, as well as that of predicting actual energy savings, adds to the problem.

Energy consumption can be measured at each cell/sector-carrier level, clusters of cells, or the whole network. Systems and methods described herein apply field data in combination with machine learning techniques to reduce unnecessary energy usage and hence improve network operation while maintaining user experience. In one embodiment, systems and methods described herein provide improved prediction of cell coverage boundaries, improved prediction of energy consumption impact, and improved prediction of performance impacts related to temporary cell site shutdowns. The combination of these different predictions may be applied to effectively manage temporary shutdowns and/or power reduction of cell sites to optimize energy consumption without negatively impacting a user's experience.

The prediction of cell coverage boundaries may include an improved method of predicting cell coverage boundaries and cell overlap as a function of a cell shutdown or power-down. True cell coverage is an inherently nonlinear function of many variables, and its accurate prediction is a regular issue for the wireless industry. According to implementations described herein, machine learning (ML) algorithms (e.g., classification) are used to exploit a rich set of empirical data and establish coverage boundaries.

The prediction of energy consumption impact may include an improved method of predicting the energy consumption associated with a cell shutdown or power-down, including the effects of coverage boundary changes. Energy consumption is also a nonlinear function of many variables and therefore difficult to predict. According to implementations described herein, ML may be applied to determine the energy consumption.

The prediction of performance impacts may include an improved method of predicting the performance associated with the above, that is, performance associated with the coverage changes and energy consumption predicted by the various models. Performance predictions may be derived from an ML-based prediction of reference signals (e.g., reference signal receive power (RSRP)), which constitute an important part of achievable performance.

With the ability to accurately predict performance changes and energy consumption associated with any collection of site shutdown/power-down, the tradeoffs between energy savings and performance impacts can be assessed in advance of any network changes.

Systems and methods may optimize power consumption for RAN devices. According to an implementation, a device (e.g., a computing device) may obtain field data of user equipment (UE) devices for a group of cells during a time interval. The field data may include signal strength measurements. The device may compute cell boundaries for each cell based on the field data and may predict signal strength values inside each of the cell boundaries for a future time period. The device may compute a cumulative overlap feature and a weighted signal strength feature for each cell of the group of cells during the future time period and may build an energy consumption predictive model that applies the cumulative overlap feature and the weighted signal strength feature for the future time period. The device may determine, based on the energy consumption predictive model, optimal cell boundaries that correspond to a minimal energy consumption needed to meet service requirements during the future time period.

FIG. 1 provides an illustration of concepts described herein. RAN devices 110 (referred to individually as RAN device 110-1, 110-2, . . . 110-n) may define cells 120 (referred to individually as cells 120-1, 120-2, . . . 120-n) which may cover a geographic area of a RAN. Each cell 120 may be divided into sectors 130 (e.g., 2, 3, 6 sectors, etc.). Radio frequency (RF) signals used by a first cell (e.g. 120-1) may overlap with signals used in one or more neighboring cells (e.g., cells 120-2, 120-3, and 120-4) with at least partially overlapping coverage areas.

To conserve energy (e.g., during low-use periods), one or more sectors 130 of a cell 120 may be turned off or powered down to reduce overall energy consumption. For example, in the illustration of FIG. 1, power for sector 130-1 (e.g., with coverage illustrated by shading), associated with the shaded area of cell 120-4, could be turned off or reduced when cells 120-1 and 120-3 provide overlapping coverage. However, if the coverage areas of any of cells 120-1, 120-3, or 120-4 are not accurately defined, reducing power to sector 130-1 could result in a coverage gap. Additionally, the reduced energy consumption from powering down sector 130-1 may be minimal and/or outweighed by additional energy consumption in other cells 120/sectors 130 due to increased signaling, for example. Furthermore, additional service loads imposed upon cells 120-1 and 120-3, when sector 130-1 is powered off, may have a negative impact on service quality.

Specific steps to improve predictions for supporting optimized base station power consumption include a combination (or sequence) of ML-based methods that are tailored to this particular problem. This sequence includes: (1) the use of ML methods to the determination of wireless cell boundaries and wireless cell coverage overlap, (2) the use of ML methods to predict energy consumption based upon a variety of features, including the use of cell overlap (above) as a key feature, and (3) the use of ML methods to predict performance changes associated with cell site shutdown/power-down, and particularly the accurate prediction of RSRP values.

Figure 2:
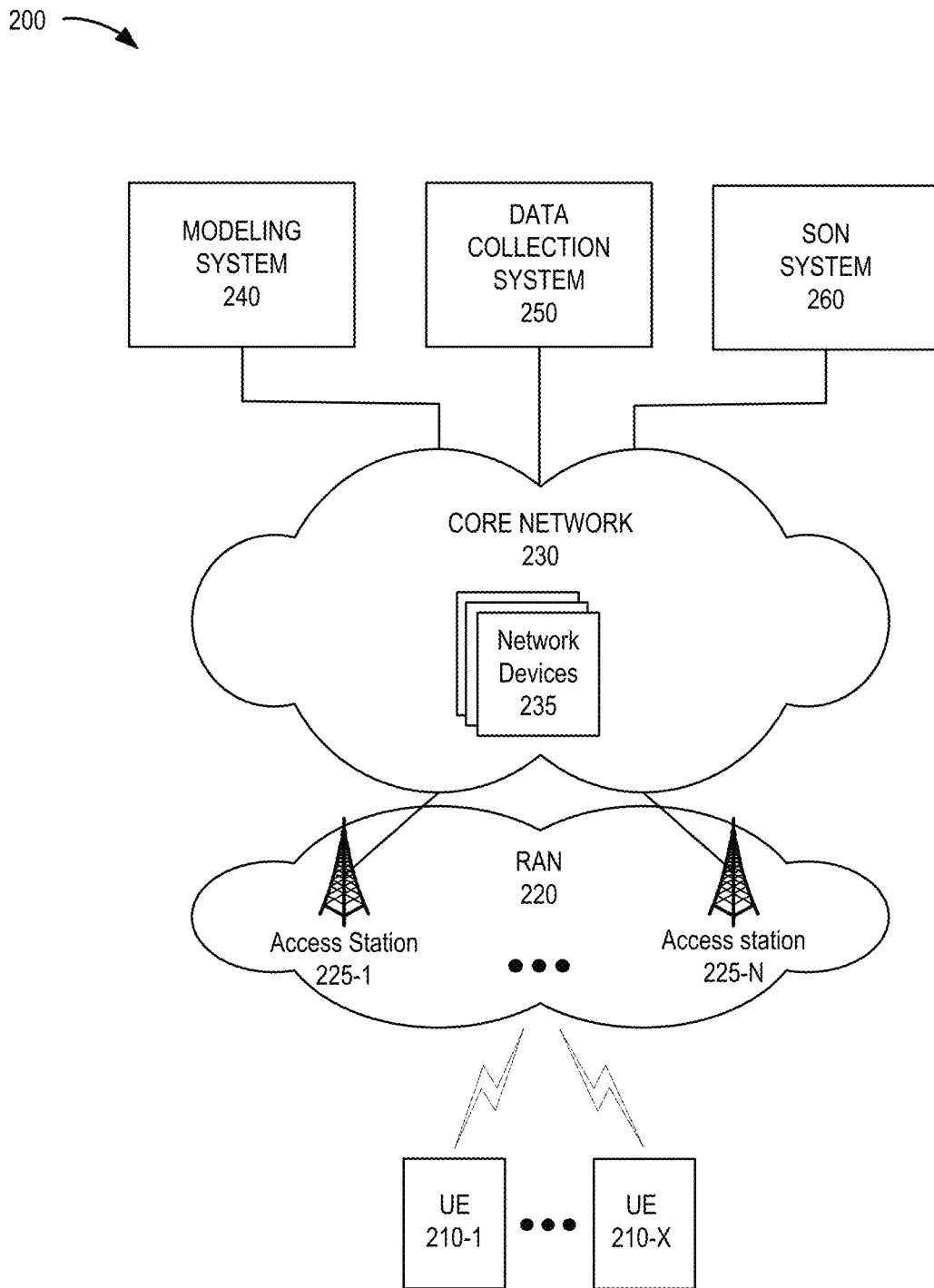
FIG. 2 is a diagram illustrating a network environment according to an implementation described herein.

FIG. 2 is a diagram of an exemplary environment 200 in which the systems and/or methods, described herein, may be implemented. As shown in FIG. 2, environment 200 may include user equipment (UE) devices 210-1 to 210-X (referred to herein collectively as "UE devices 210" and individually as "UE device 210"), a RAN 220, a core network 230, a modeling system 240, a data collection system 250, and a self-organizing network (SON) system 260.

UE device 210 may include any device with long-range (e.g., cellular or mobile wireless network) wireless communication functionality. For example, UE device 210 may include a handheld wireless communication device (e.g., a mobile phone, a smart phone, a tablet device, etc.); a wearable computer device (e.g., a wristwatch computer device, etc.); a portable computer; a customer premises equipment (CPE) device, such as a set-top box or a digital media player, a WiFi access point, a smart television, etc.; a mobile device; a portable gaming system; global positioning system (GPS) device; a home appliance device; a home monitoring device; and/or any other type of computer device with wireless communication capabilities. Other examples of UE device 210 may include a machine-type communication (MTC) device, an Unmanned Aerial Vehicle (UAV), and an autonomous terrestrial vehicle.

According to an implementation, UE devices 210 may provide (e.g., to data collection system 250) historical measurement reports that may include location coordinates (e.g., GPS, assisted GPS, etc.) and received signal strength measurements (such as RSRP measurements) from detectable access stations 225 seen at an instance of time. Other examples of signal strength measurements may include a Received Signal Strength Indicator (RSSI), a Reference Signal Received Quality (RSRQ) value, a signal-to-noise ratio (SNR), a signal-to-interference-plus-noise ratio (SINR), or another type of channel condition value. Measurement reports and other mobile UE device data may be generically referred to herein as "field data."

RAN 220 may enable UE devices 210 to connect to core network 230 for mobile telephone service, text message services, Internet access, cloud computing, and/or other types of data services. RAN 220 may include one or multiple networks of one or multiple types and technologies. For example, RAN 220 may include a Fifth Generation (5G) RAN, a Fourth Generation (4G) RAN, a 4.5G RAN, and/or another type of future generation RAN. By way of further example, RAN 220 may be implemented to include a Next Generation (NG) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN).

RAN 220 may include radio access stations 225-1 to 225-N (referred to herein collectively as "access stations 225" and individually as "access station 225"). Access station 225 may include one or more devices and other components that allow UE devices 210 to wirelessly connect to RAN 220. Access stations 225 may correspond, for example, to RAN devices 110 of FIG. 1. Each access station 225 may service a set of UE devices 210. For example, access station 225-1 may service some UE devices 210 when the UE devices 210 are located within the geographic area serviced by access station 225-1, while other UE devices 210 may be serviced by another access station 225 when the UE devices 210 are located within the geographic area serviced by the other access station 225.

Depending on the implementation, RAN 220 may include one or multiple types of access stations 225. For example, access station 225 may include an evolved Node B (eNB), an evolved Long Term Evolution (eLTE) eNB, a next generation Node B (gNB), a radio network controller (RNC), a remote radio head (RRH), a baseband unit (BBU), a small cell node (e.g., a picocell device, a femtocell device, a microcell device, a home eNB, a repeater, etc.), a base station, or another type of wireless node. Access stations 225 may connect to core network 230 via backhaul links, such as wired or optical links. According to various embodiments, RAN 220 may be implemented according to various wireless technologies (e.g., radio access technology (RAT), etc.), wireless standards, wireless frequencies/bands, and so forth.

In some embodiments, access station 225 may include a one or more radio frequency (RF) transceivers facing particular directions. For example, access station 225 may include three RF transceivers and each RF transceiver may service a 120-degree sector of a 360-degree field of view. Each RF transceiver may include an antenna array. The antenna array may include an array of controllable antenna elements configured to send and receive RF signals via one or more antenna beams. The antenna elements may be mechanically or digitally controllable to tilt, or adjust the orientation of, an antenna beam in a vertical direction and/or horizontal direction.

Core network 230 may manage communication sessions for UE devices 210. Core network 230 may provide mobility management, session management, authentication, and packet transport, to support UE device 210 and access station 225 wireless communications using, for example, a dual connectivity and/or multi-RAT configuration. Core network 230 may be compatible with known wireless standards which may include, for example, 3GPP 5G, LTE, LTE Advanced, Global System for Mobile Communications (GSM), Universal Mobile Telecommunications System (UMTS), IS-2000, etc. Some or all of core network 230 may be managed by a communication services provider that also manages RAN 220 and/or UE device 210. Core network 230 may allow the delivery of Internet Protocol (IP) services to UE device 210 and may interface with other external networks. Core network 230 may include one or more server devices and/or network devices, or other types of computation or communication devices (referred to collectively as network devices 235).

Modeling system 240 may include one or more devices, such as computer devices and/or server devices, which perform modeling of RAN cells and power optimization scenarios. Modeling system 240 may include one or more trained ML models. For example, modeling system 240 may include a collaborative framework that is based on four distinct parts: (1) a procedure for computing effective cell boundaries, (2) a procedure for predicting RSRP values within a boundary, (3) a procedure for estimating sector-carrier area overlap with other neighboring cells, and (4) procedure for modeling energy consumption by each cell. Modeling system 240 is described further, for example, in connection with FIG. 3.

Data collection system 250 may collect and store network data of RAN 220. For example, data collection system 250 may generate records for access stations 225. The records may include location data and identify the configured sector data and corresponding carrier frequencies. Data collection system 250 may also obtain mobility pattern data for UE devices 210 within RAN 220. In one implementation, data collection system 250 may log measurement reports from individual UE devices 210. As noted above, the measurement reports may include actual RSRP values (or other signal strength measurements) associated with a time and location. According to implementations described herein, data collection system 250 may provide the RAN data as field data to modeling system 240 for modeling and detection of power optimization scenarios.

Figure 6:
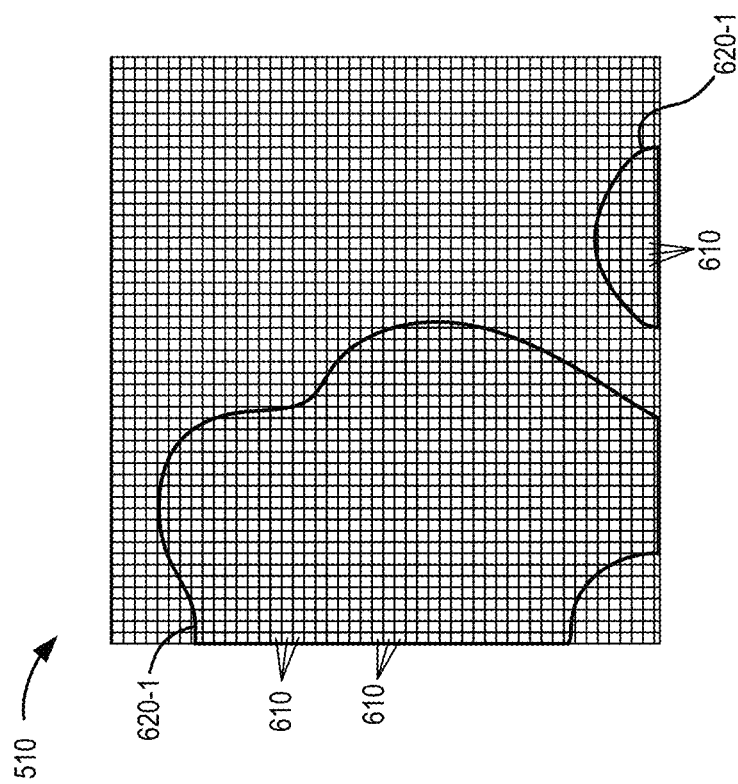
FIG. 6 is a diagram illustrating a grid applied to a geographic area of interest and a discontinuous cell boundary.

Different types of field data can be used as features for building models and implementing the methods described herein. While a list of some features is provided below, in other embodiments, the list may include additional attributes not shown below. Generally, features may be divided into three groups, including (1) attributes describing a corresponding cell, (2) aggregation of UE-related attributes for a grid segment (e.g., grid segments 610 of FIG. 6), and (3) target/control features. Group (1) attributes may include, for example, total energy consumed for an interval, the mechanical tilt (in degrees) of the antenna in a cell, antenna pattern/electrical tilt degree, total transmit power (in Watts) for a cell, etc. Group (2) attributes may include, for example, UE device location coordinates, UE device make/model, RSRP measurement, RSRQ measurement, SINR, call drop rate, etc. Group (3) attributes may include, for example, total energy consumed for an interval, total call drop rate (maximum threshold), and total throughput (minimum threshold). While only a few features are mentioned herein as examples, in practice dozens of different features may be used in Groups (1) and (2) to support modeling described herein. Similarly, different target/control features may be used for Group (3).

SON system 260 may include one or more devices, such as computer devices and/or server devices, which perform part of self-organization functions for RAN 220 and/or core network 230. SON system 260 may obtain information relating to access stations 225 and may perform SON actions to implement power optimization scenarios based on recommendations/models generated by modeling system 240. For example, SON system 260 may send an instruction to access station 225, such as, for example, an instruction to shut down a sector-carrier, adjust one or more coverage optimization parameters, adjust one or more power distribution parameters, and/or perform another type of adjustment. According to an implementation, SON system 260 may receive prioritized recommendations (e.g., projected power savings by a cell or sector carrier) from modeling system 240 and may perform the recommended SON adjustment or solicit authorization to perform the recommended SON adjustment.

Although FIG. 2 shows exemplary components of environment 200, in other implementations, environment 200 may include fewer components, different components, differently arranged components, or additional components than depicted in FIG. 2. Additionally, or alternatively, one or more components of environment 200 may perform functions described as being performed by one or more other components of environment 200.

Figure 3:
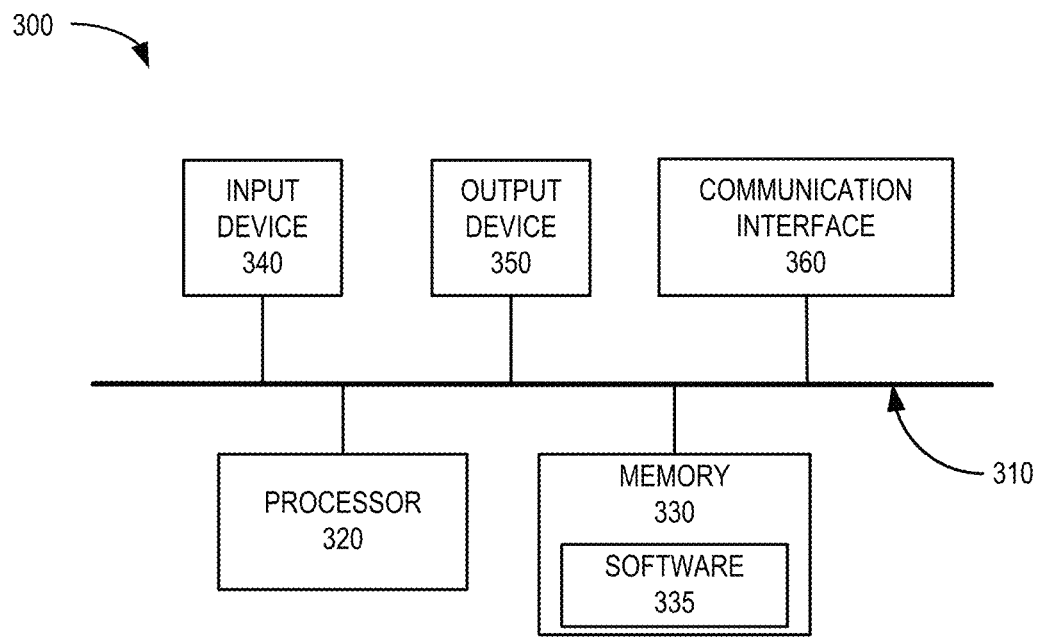
FIG. 3 is a diagram illustrating example components of a device that may be included in a network environment, according to an implementation described herein.

FIG. 3 is a diagram illustrating example components of a device 300 according to an implementation described herein. UE device 210, access station 225, network devices 235, modeling system 240, data collection system 250, SON system 260, and/or other components of network environment 200 may each include one or more devices 300 or may be implemented on one of more devices 300. As shown in FIG. 3, device 300 may include a bus 310, a processor 320, a memory 330 including software 335, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logic) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information (e.g., software 335, data, etc.) for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 335 includes an application or a program that provides a function and/or a process. Software 335 may also include firmware, middleware, microcode, hardware description language (HDL), and/or other form of instruction. By way of example, with respect to computing elements that include logic to provide RAN models, these network elements may be implemented to include software 335.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to optimizing base station power consumption. Device 300 may perform these operations in response to processor 320 executing instructions (e.g., software 335) contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
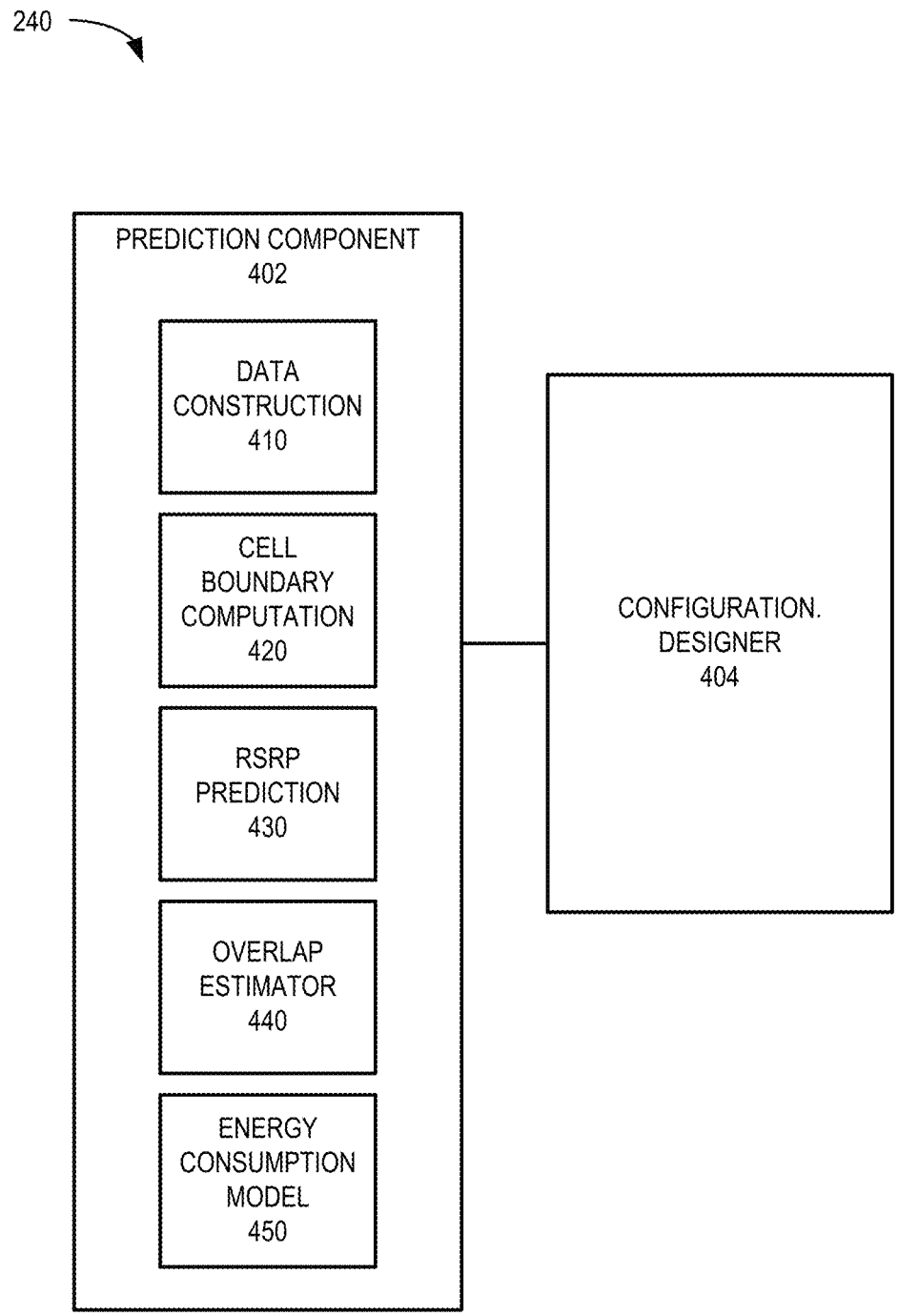
FIG. 4 is a diagram illustrating example logical components of a modeling system, according to an implementation described herein.

FIG. 4 is a diagram illustrating exemplary logical components of modeling system 240. The components of modeling system 240 may be implemented, for example, via processor 320 executing software 335 from memory 330. Alternatively, some or all of the components of modeling system 240 may be implemented via hard-wired circuitry. In some implementations, one or more components of modeling system 240 may include machine learning models, such as, for example, a K-nearest neighbors classifier, a decision tree classifier, a naïve Bayes classifier, a support vector machine (SVM) classifier, tree based (e.g., a random forest) classifier using Euclidian and/or cosine distance methods, and/or another type of classifier. Other configurations may be implemented. Therefore, modeling system 240 may include additional, fewer and/or different logical components than those depicted in FIG. 4.

As shown in FIG. 4, modeling system 240 may include a prediction component 402 and a configuration designer 404. Prediction component 402 may include a Data construction module 410, a cell boundary computation module 420, an RSRP prediction module 430, an overlap estimator 440, and an energy consumption model 450. Data construction module 410 may define time intervals, identify neighboring cells that serve UE's 210 on the same carrier, select subsets of cells serving a geographic area of interest, define grid sizes for the geographic area (e.g., grid segments 610, FIG. 6), and apply data from data collection system 250. Time intervals may indicate time intervals for prediction of optimized power consumption settings. For example, time intervals may include N intervals per calendar day, where N may be 2, 4, or more intervals per day.

Figure 5A:
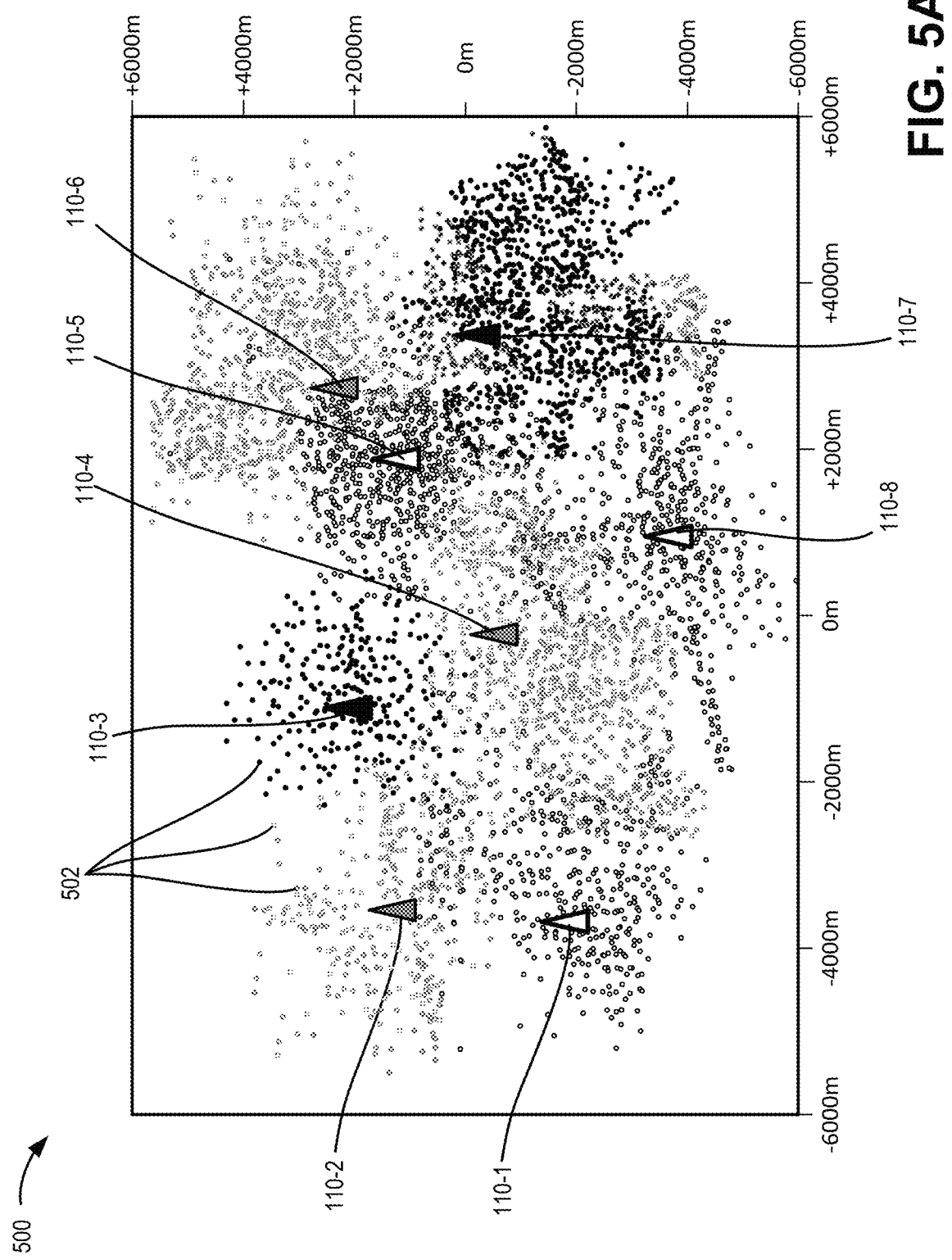
FIG. 5A is a diagram illustrating user equipment (UE) signal measurements, according to an implementation.

Data construction module 410 may identify clusters of cells 120 within a geographic area of interest and serving UE devices 210 on the same carrier. Data construction module 410 may obtain (e.g., from data collection system 250) field data for the particular cluster and time interval and drop field data with signal strength measurements below an operational threshold. For example, FIG. 5A illustrates a geographic area 500 (e.g., of about 12000 square meters) with data points 502 representing locations of UE signal measurements for multiple RAN devices 110-1 through 110-5. Historical data from measurement reports of UE devices 210 may be used to indicate coverage/signal strength associated with different RAN devices 110.

Figure 5B:
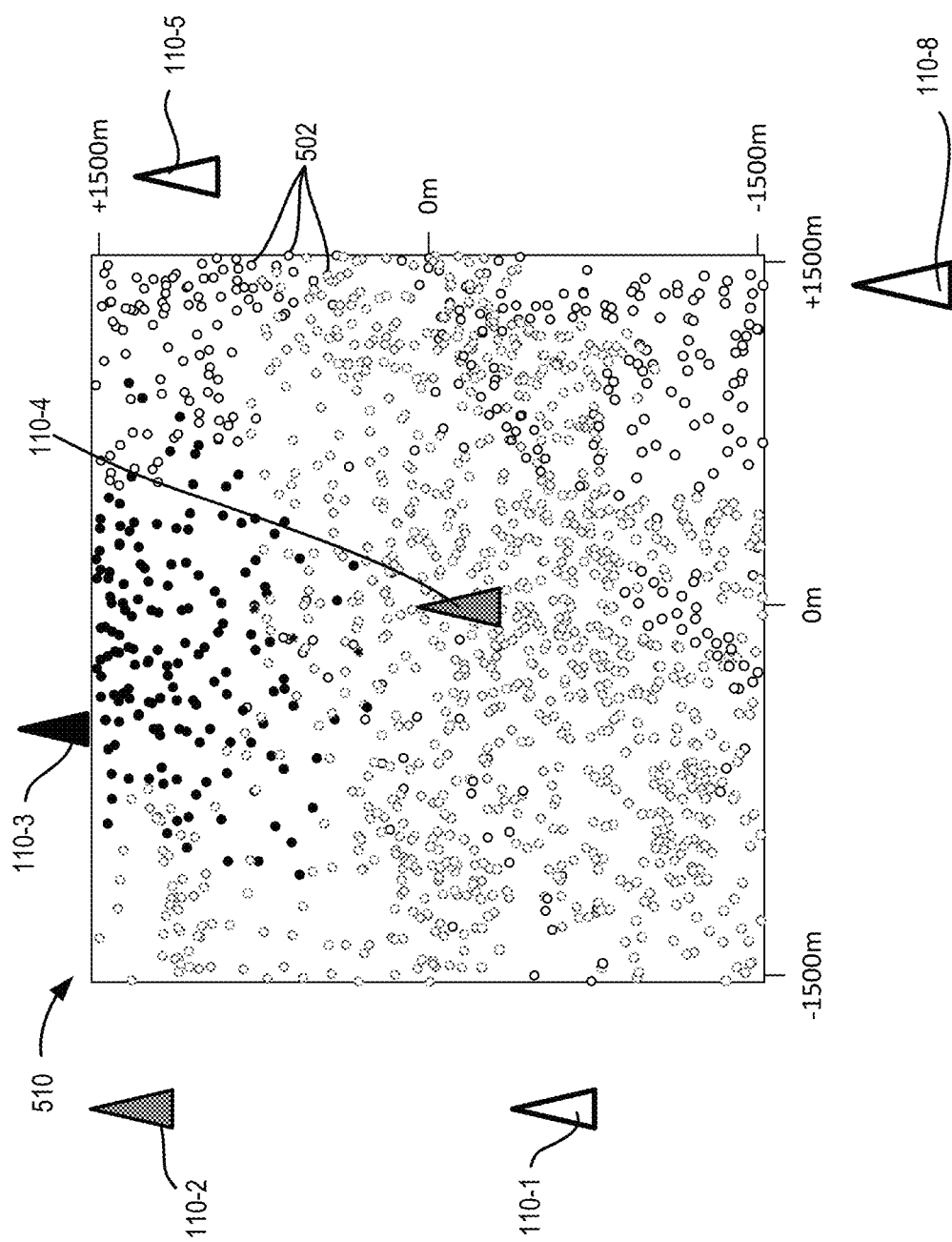
FIG. 5B is a diagram illustrating a geographic area of interest for energy optimization analysis.

FIG. 5B is a diagram illustrating a geographic area of interest (e.g., within geographic area 500) for energy optimization analysis. As shown in FIG. 5B, data construction module 410 may select, or be provided with a geographic area of interest 510. Geographic area of interest 510 (e.g., of about 3000 square meters) may include data points 502 for a subset of cells from one or more RAN devices 110 (e.g., RAN device 110-4) in area 500, along with data points 502 of other RAN devices 110 (e.g., outside area 510) during a particular time interval. In one implementation, cells to be evaluated in the geographic area of interest 510 may be selected based on activity levels detected/projected during the time interval. For example, cells/sectors that service less than a particular threshold of UE devices 210 in the area of interest (e.g., less than 20 percent of the highest amount of UE devices 210 serviced by a cell) may not be considered for analysis. In the example of FIG. 5B, RAN devices 110-6 and 110-7 from FIG. 5A (not shown in FIG. 5B), along with sectors 130 of other RAN devices 110 that are directed away from area 510 are excluded from further analysis. Data construction module 410 may construct data sets for each remaining cell in the geographic area. The data sets may include coordinates of a UE device 210 that was served by a cell 120 during the time interval, and a corresponding signal strength (e.g., RSRP) value.

Data construction module 410 may also store parameters to be used by energy consumption model 450 and/or other modules of prediction component of 402. For example, thresholds for target/control features (e.g., Group (3) features above) and other threshold settings may be included in data construction module 410.

Cell boundary computation module 420 may apply a classification algorithm to determine boundaries of each cell in a geographic area based on the data sets for the time interval. Cell boundary computation module 420 may select a subset of cell clusters for analysis based on projected activity levels during the future time period and apply grid segments for the geographic area of interest. Cell boundary computation module 420 may associate signal strength measurement values with each grid segment and cell of the subset, and compute a boundary for each cell of the subset based on the associated signal strength measurement values and grid segment. For example, cell boundary computation module 420 may consider two classes for each cell's data set: a class of points with coordinates from the cell (e.g., associated with RAN device 110-4 in FIG. 5B), and a class of points corresponding to the remaining cells (e.g., associated with RAN devices 110-1, 110-2, 110-3, 110-5, and 110-8). A specific choice of classification algorithm may be determined by the business priorities on choosing an acceptable tradeoff between precision and recall or by overall accuracy of the model on a training set. For example, cell boundary computation module 420 may use a support vector machine, a kernel method, etc., or a combination of ML algorithms. Once a cell boundary is computed, cell boundary computation module 420 may define the corresponding service area of the cell during the selected time interval. In some instances, a service area may be a union of disjointed geometric shapes as shown, for example, in FIG. 6, for a service area 620-1 associated with RAN device 110-1. Service area 620-1 may correspond to a cell during a designated time interval.

RSRP prediction module 430 may compute future RSRP values within the area of each of the defined grid segments 610 (defined in data construction module 410) within a cell's service area 620 identified by cell boundary computation module 420. For example, referring to FIG. 6, for a given time interval, RSRP prediction module 430 may use actual data from RSRP measurement reports (e.g., corresponding to data points 502 of FIG. 5B) to generate a ML model and predict RSRP values for each grid segment 610 within the cell's service area 620. If actual signal strength measurements exist within a grid segment 610, RSRP prediction module 430 may identify an average of the reported measurements. If no signal measurements are reported for a grid segment 610 within a service area 620, RSRP prediction module 430 may predict a signal strength measurement for the grid segment. RSRP prediction module 430 may use one of a number of predictive machine learning models, such as XGBoot, Random Forest, neural networks, etc., or a combination. The choice of the model will be decided by the accuracy on a testing set and by business priorities on choosing between precision and recall. RSRP prediction module 430 may compute RSRP values for multiple cells/service areas in the geographic area of interest.

Figures 7, 8:
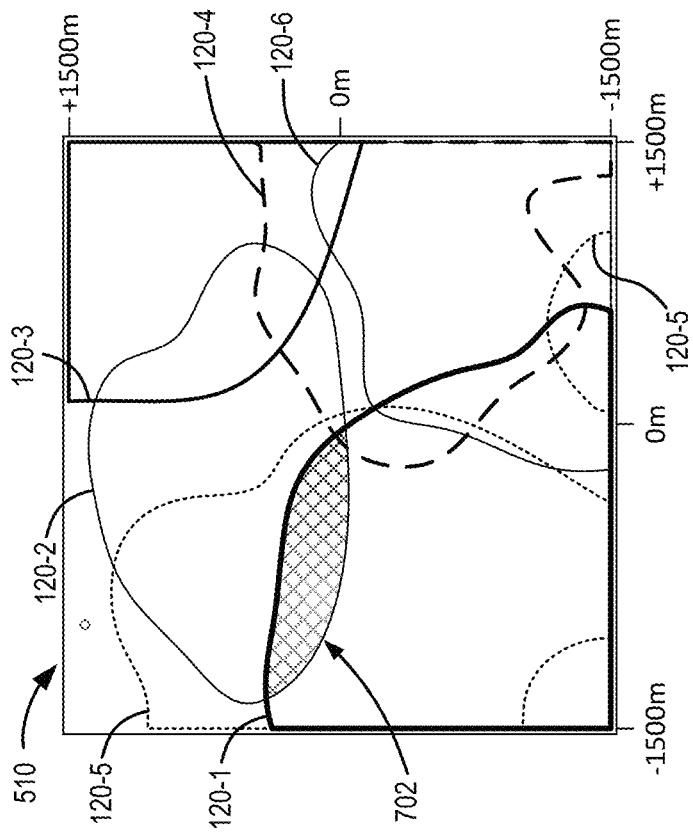
FIG. 7 is a diagram illustrating overlapping cell boundaries in a geographic area of interest.
FIG. 8 is a table showing an estimate of corresponding cell overlap in a geographic area of interest.

Overlap estimator 440 may analyze coverage overlap between cells in the geographic area of interest. More particularly, overlap estimator 440 may use boundaries (from cell boundary computation module 420) and RSRP values (from RSRP prediction module 430) for all cells to analyze where coverage areas overlap for each given cell and to form a feature out of that information for an energy prediction model. For example, FIG. 7 illustrates overlapping cell boundaries in geographic area of interest 510. Referring to FIG. 7, coverage areas for six different cells 120-1 through 120-6 during the same time interval are shown with various amounts of overlap. For example, cell 120-1 overlaps with cells 120-2, 120-4, 120-5, and 120-6; while cell 120-2 overlaps with cells 120-1, 120-3, 120-4, and 120-5.

In FIG. 8, a summary table 800 is illustrated showing one way of estimating the corresponding overlaps shown in FIG. 7. Table 800 may include a row label indicator column 810, a column label row indicator row 820, and a variety of values 830 corresponding to each column/row combination. Each value 830 is the corresponding overlap area as a percentage of area of the cell corresponding to the row. For example, observe that the value in the row "1" and column "2" is 9.1, which means that the overlapping area 702 (FIG. 7) between cell 120-1 and cell 120-2 is 9.1% of area of cell 120-1.

Still referring to FIG. 8, the right-most column 840 shows the cumulative overlapping area for a particular cell. For example, for cell 120-1, the overlapping percentage for all cells is 109.3 (i.e., 9.1+0+10.2+74+16). It is expected that when the RAN traffic is low (e.g., at night) capacity demand of a cell can be met with a smaller coverage area (e.g., less overlap). To reduce a cell's coverage area, a network operator can, for example, change tilt of an antenna or shut down the cell entirely. Energy consumption that depends on cell overlap is evaluated by the corresponding predictive model described below. For each overlapping area, overlap estimator 440 can determine the average RSRP value, and by averaging all such values, overlap estimator 440 may compute a radio-quality-of-overlap feature, which is referred to generically herein as a "weighted signal strength" feature. As described further herein, the weighted signal strength feature may be applied (e.g., by energy consumption model 450) with other features to predict where cell coverage reductions may be implemented during a future time period. In other implementations, different cumulative overlap features and weighted signal strength features may be used.

More detailed examples of cumulative overlap features and weighted signal strength features are described below in connection with FIG. 11.

Energy consumption model 450 may build an energy consumption predictive model with cell boundary overlap being one of the features. The energy consumption model may be, for example, XGBoot, Random Forest, neural network, or another regression model, or a combination of models. The energy consumption predictive model may indicate possible energy saving by implementing a shutdown, power-down, or another power-saving adjustment of one or more cells/sectors in the geographic area of interest. Other features (in addition to cell boundary overlap) used for the energy consumption predictive model may include different RAN key performance indicators (KPI). For example, features of the energy consumption predictive model may include energy metering support, total number of radio units in the area of interest, number of cells sharing a radio unit, physical resource block (PRB) utilization (downlink), average UE packet data convergence protocol (PDCP) layer downlink throughput, Physical Downlink Control Channel (PDCCH) utilization throughput (pmPrbUtilDl). The features may be weighted, for example, to indicate importance toward changing energy consumption. For example, once the energy consumption predictive model is constructed, the importance of each feature to impacting energy consumption may be evaluated. The evaluation may include not only how changes in a single feature value impacts overall energy usage, but also how a combination of features does the same. Such analysis allows enables selection the best feature values that will reduce energy consumption.

Configuration designer 404 may translate results from prediction component 402 into implementation instructions and/or recommendations for RAN 220. For example, configuration designer 404 may perform proactive configuration for RAN devices 110, and also the antenna sub-systems used, to provide optimal energy usage during certain time intervals and within the geographic area of interest for RAN 220. For example, configuration designer 404 may apply the energy consumption predictive model from energy consumption model 450 to identify proposed temporary shutdown/power-down of RAN devices 110. Additionally, or alternatively, configuration designer 404 may provide prioritized recommendations (e.g., to SON system 260) for energy savings. In other implementations, configuration designer 404 may apply traffic steering to another frequency band or reducing carrier aggregation with the removal of a particular frequency band.

Figure 9:
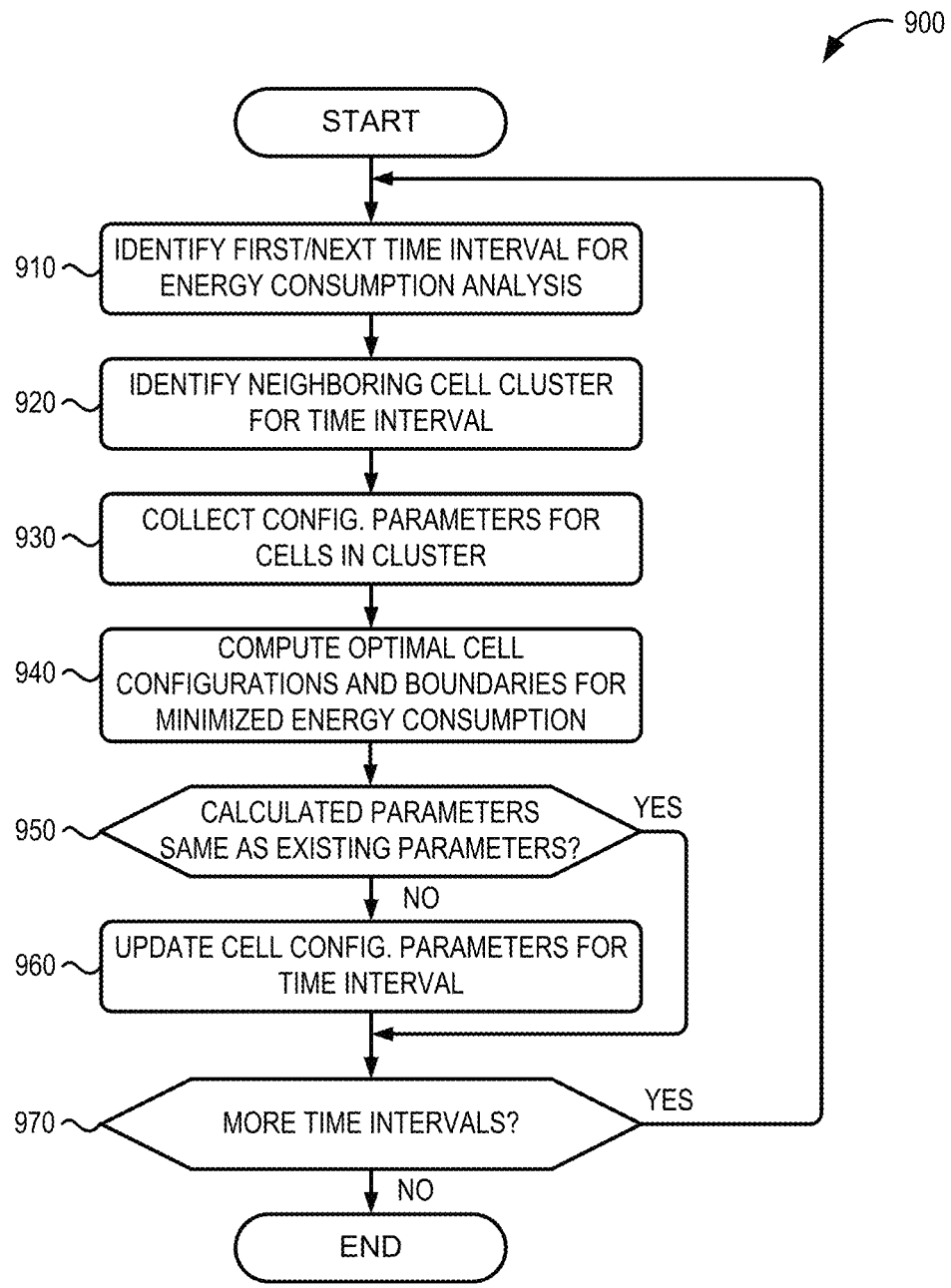
FIGS. 9 and 10 are flow diagrams illustrating an exemplary process for implementing optimized base station energy consumption, according to an implementation described herein.

FIG. 9 is a flow diagram illustrating an exemplary process 900 for implementing optimized base station energy consumption. In one implementation, process 900 may be implemented by modeling system 240. In another implementation, process 900 may be implemented by modeling system 240 in conjunction with one or more other network devices in network environment 200.

Process 900 may include identifying a first time interval for the energy consumption analysis (block 910), and identifying a first neighboring cell cluster corresponding to a geographic area of interest (block 920). For example, modeling system 240 may select, or may be assigned, time intervals for analysis. In one implementation, modeling system 240 may split a day (e.g., a particular calendar day, day of the week, etc.) into N time intervals, which may be of equal or unequal duration. A time interval may be, for example, one, two, four, six hours, etc., and may correspond to a period for predicting RAN configurations to achieve minimal energy consumption. Modeling system 240 may identify, or be provided with identifiers for, a cluster of neighboring cells (e.g., cells 120) serving UE devices 210 on the same carrier.

Process 900 may further include collecting configuration parameters for cells in the cell cluster (block 930), computing cell configurations and boundaries for minimized energy consumption (block 940), and determining if the calculated parameters are the same as existing cell parameters (block 950). For example, for each cell 120 in the cluster, modeling system 240 may identify (or be provided with) cell configuration parameters impacting the cell coverage area. For example, configuration parameters may include azimuth degree, maximum power, regulatory power, frequency band, antenna height, tilt settings, energy consumed for a previous interval, etc. As described further below in connection with FIG. 10, modeling system 240 may generate a series of models using the configuration parameters and required performance levels to identify an optimized set of cell parameters for the cluster. Modeling system 240 may provide optimized parameters to configuration designer 404 for comparison with an existing configuration setting for the time interval under evaluation.

If the calculated parameters are not the same as existing cell parameters (block 950—No), process 900 may include updating the cell configuration parameters for the selected time interval (block 960). For example, configuration designer 404 may identify that the existing configuration settings for the cell cluster at the upcoming time interval do not match the optimized parameters and, in response, provide the optimized parameters to SON system 260 for implementation at the upcoming time interval.

If the calculated parameters are the same as existing cell parameters (block 950—Yes) or after updating the cell configuration parameters for the selected time interval in block 960, process 900 may determine if there are more time intervals to evaluate (block 970). For example, modeling system 240 may continue to determine optimized parameters additional time intervals associated with the geographic area of interest.

If there are more time intervals to evaluate (block 970—Yes), process 900 may return to block 910 to identify a next time interval for the energy consumption analysis. If there are no more time intervals to evaluate (block 970—No), process 900 may end.

Figure 10:
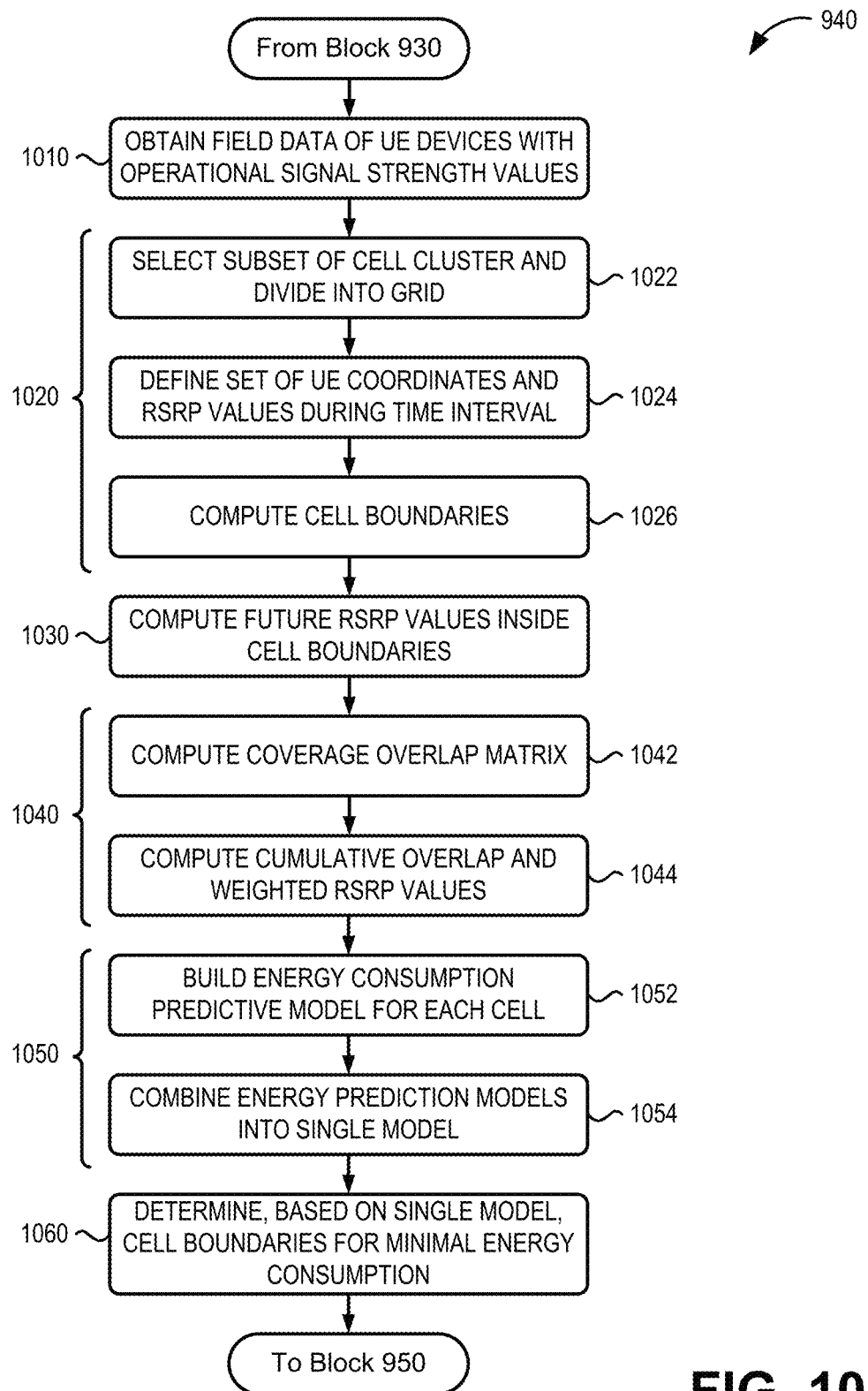

Process block 940 may include blocks described in FIG. 10. As shown in FIG. 10, process block 940 may include obtaining field data of UE devices 210 with operational signal strength values (block 1010). For example, modeling system 240 may retrieve (e.g., from data collection system 250) field data reported by UE devices 210 from the cluster of cells during each time interval, and drop all field data where the signal strength (e.g., RSRP) is below a predefined (low) non-operational value. For example, in one implementation, field data with RSRP values lower than −130 dBm may be dropped.

Process block 940 may further include determining cell boundaries based on the field data (block 1020). In one implementation, block 1020 may include sub-steps 1022, 1024, and 1026 to determine the cell boundaries. For example, modeling system may determine a subset of cells, in a geographic area of interest, to analyze based on activity levels, as described above in connection with FIG. 5B. For the subset of cells 120 serving the area of interest, modeling system 240 may divide the geographic area in to a grid of equal-sized rectangles (e.g., grid segments 610) (block 1022). Modeling system 240 may define data sets to include locations and signal strength measurements for the same cell 120 and time interval (block 1024). For each cell 120, modeling system 240 may build and use a ML algorithm to compute the cell boundary based on combined properties within the different grid segments, as described above in connection with FIG. 6 (block 1026).

Process block 940 may also include computing future signal strength values inside the cell boundaries (block 1030), and determining overlapping coverage areas (block 1040). For example, modeling system 240 may build a signal strength prediction model for each cell and use it to compute RSRP values inside the boundary (as identified above) of each corresponding cell. In one implementation, block 1040 may include sub-steps 1042 and 1044 to determine overlapping coverage areas. For example, modeling system 240 may generate a coverage overlap matrix (e.g., coverage overlap matrix 800) for each cell of the geographic area of interest (block 1042). Modeling system 240 may then compute a cumulative overlap value (e.g., column 840) and weighted signal strength value for each cell 120 (block 1044).

Process block 940 may additionally include generating an energy prediction model (block 1050), and determining, based on the energy prediction model, cell boundaries for minimal energy consumption (block 1060). In one implementation, block 1050 may include sub-steps 1052 and 1054 to generate an energy prediction model. For example, modeling system 240 may build an energy consumption predictive model for each cell using system KPIs and attributes as features, along with the newly computed cumulative overlap feature and weighted signal strength feature (block 1052). For each cell's energy prediction model, modeling system 240 may evaluate the importance of features and combinations of features. Modeling system 240 may, for example, enhance each cell's energy consumption predictive model as needed to add new features as combinations. Modeling system 240 may combine the energy consumption predictive model from each cell into one model that combines all features of the individual models to predict overall energy consumption for the geographic area of interest (block 1054). Using the combined model, modeling system 240 may identify cell boundaries that correspond to the minimal energy consumption subject to capacity and coverage that must be supported in the corresponding future time interval.

Figure 11:
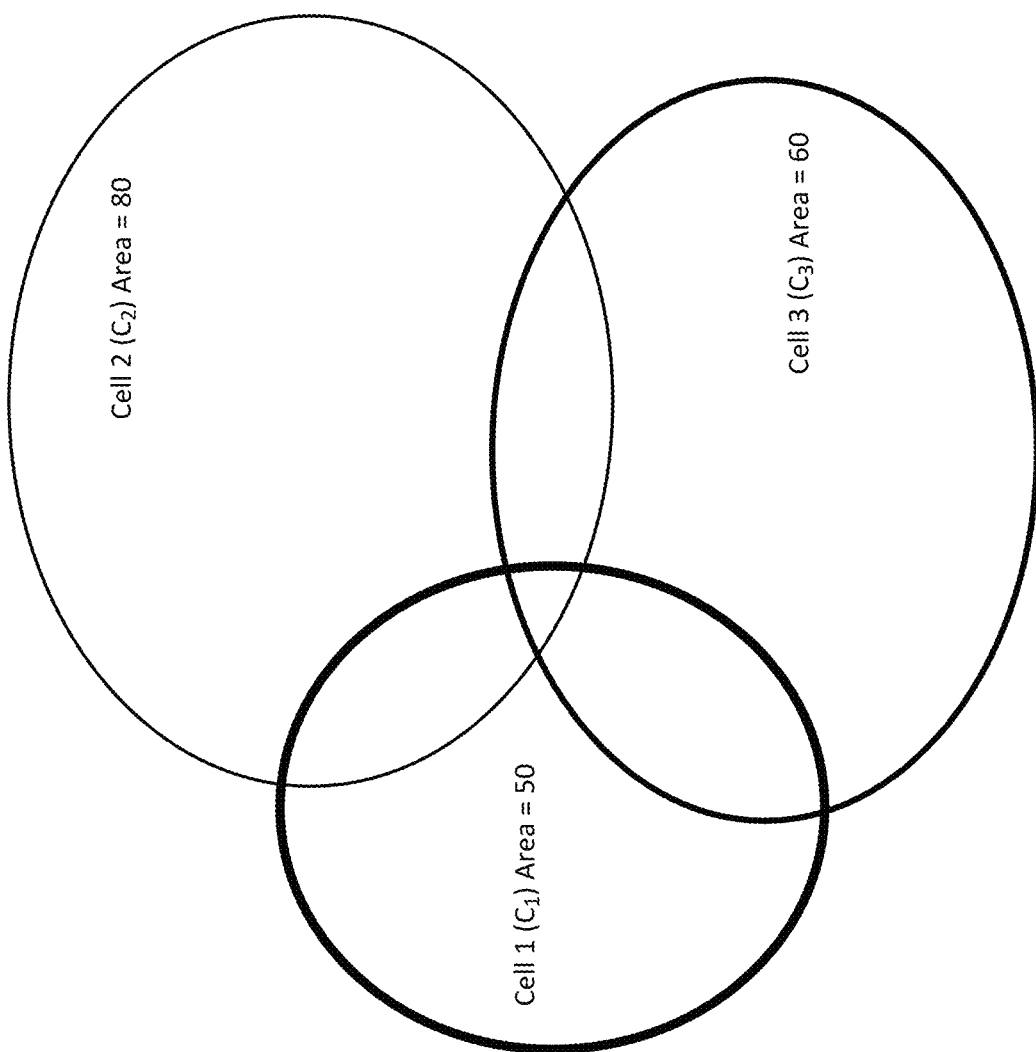
FIG. 11 a simplified overlapping cell arrangement illustrating particular coverage features that may be calculated by a modeling system.

FIG. 11 is a diagram of a simplified overlapping cell arrangement to illustrate particular features that may be calculated by modeling system 240 to generate an energy consumption predictive model. For any two cells $C_n$ and $C_m$, let $A_n$ and $A_m$ be their respective coverage areas. Overlap areas between two cells may be denoted as $O_{nm}=O_{mn}$. Part of $A_n$ that is shared with $A_m$ is the "Partial area of $C_n$ overlapping with $C_m$," which may be defined as:

$$P_{nm} = 100 \frac{O_{nm}}{A_n}$$

For each point of $A_n$, RSRP($C_n$) emitted by the antenna at $C_n$ can be estimated (e.g., using the RSRP ML model described above). Hence, the average RSRP for the area $O_{nm} \subset A_n$ emitted by $C_n$ is:

$$S_{nm} := \frac{1}{|O_{nm}|} \sum_{p \in O_{nm}} RSRP_p(C_n)$$

Referring to FIG. 11, consider three cells $C_1$, $C_2$, $C_3$ with areas $A_1$, $A_2$, $A_3$. Each cell, $C_n$, may have features including a Cumulative Partial Overlap Area (CPOA), a Cumulative Overlap Area (COA), a Partial Overlap Area Weighted Signal (POAWS), and an Overlap Area Weighted Signal (OAWS). Each of these features may be defined as follows:

$$CPOA_n := \sum_{k \neq n} P_{nk}$$

$$COA_n := \sum_{k \neq n} O_{nk}$$

$$POAWS_n = -\frac{\sum_{k \neq n} S_{nk} P_{nk}}{\sum_{k \neq n} O_{nk}}$$

$$OAWS_n = -\frac{\sum_{k \neq n} S_{nk} O_{nk}}{\sum_{k \neq n} O_{nk}}$$

As an example, in FIG. 11, assume three cells $C_1$, $C_2$, $C_3$ have areas $A_1=50$, $A_2=80$, $A_3=60$ (dimensions in square meters are not shown for simplicity). Further assume that the corresponding overlap areas and average RSRP values are as follows:

$O_{12}=O_{21}=30$, $O_{13}=O_{31}=20$, $O_{23}=O_{32}=10$;

and $S_{12}=-90$ $S_{21}=-95$ $S_{13}=-85$ $S_{31}=-92$ $S_{23}=-75$ $S_{32}=-82$.

In this example, the average signal strength in the area $O_{12}=O_{21}$ from cell $C_1$ is −90 dBm, while the average signal strength in the same area $O_{12}=O_{21}$ from cell $C_2$ is −95 dBm. Then the partial area of $C_n$ overlapping with $C_m$ (i.e., P) is:

$P_{12}=60$ $P_{21}=38$ $P_{13}=40$ $P_{31}=33$ $P_{23}=13$ $P_{32}=17$.

As shown above, the overlap area $P_{12}$ is 60% of the cell C1 area (i.e., 30/50), while the overlap area $P_{21}$ is 38% of the cell C1 area (i.e., 30/80). Given the above values for O, S, and P, the corresponding feature values for each of cells $C_1$, $C_2$, $C_3$ are thus:

$C_1$: $CPOA_1=100, COA_1=50, POAWS_1=176$, and $OAWS_1=88$ $C_2$: $CPOA_2=50, COA_2=40, POAWS_2=112,$ and $OAWS_2=90$ $C_3$: $CPOA_3=50, COA_3=30, POAWS_3=148,$ and $OAWS_3=89.$ Values for CPOA, COA, POAWS, and/or OAWS may be applied by modeling system 240, for example, individually, collectively, or in different combinations to provide a cumulative overlap feature and weighted signal strength feature for use in the energy consumption predictive model described above.

Systems and methods described herein provide an open-loop approach for optimizing base station power consumption. Systems and methods predict cell coverage boundaries and cell overlap as a function of site shutdown or power-down. With the ability to accurately predict performance changes and energy consumption associated with any combination of site shutdown/power-down, tradeoffs between energy savings and performance impacts can be studied and assessed in advance of any changes. Changes to cell site parameters may then be made to provide optimal power savings while maintaining use quality of experience.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 9 and 10, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   obtaining, by a computing device, field data of user equipment (UE) devices for a group of cells covering a geographic area of interest during a time interval, wherein the field data includes signal strength measurements;
   computing, by the computing device, cell boundaries for each cell of the group of cells based on the field data;
   predicting, by the computing device, signal strength values inside each of the cell boundaries for a future time period;
   computing, by the computing device, a cumulative overlap feature and a weighted signal strength feature within the geographic area of interest for each cell of the group of cells during the future time period;
   generating, by the computing device, an energy consumption predictive model that applies the cumulative overlap feature and the weighted signal strength feature for the future time period; and determining, by the computing device and based on the energy consumption predictive model, first cell boundaries that correspond to a reduced energy consumption needed to meet service requirements during the future time period.

2. The method of claim 1, further comprising:
updating configuration parameters for each cell of the group of cells to identify the first cell boundaries during the future time period.

3. The method of claim 1, further comprising:
identifying, by the computing device, areas of coverage overlap of the group of cells for the future time period.

4. The method of claim 1, wherein computing the cell boundaries further comprises:
selecting a subset of cell clusters for analysis based on projected activity levels during the future time period;
defining grid segments for the geographic area of interest;
associating signal strength measurement values with a grid segment and a cell of the subset; and
applying a machine learning algorithm to compute a boundary for each cell of the subset based on the associated signal strength measurement values and grid segment.

5. The method of claim 1, wherein computing the cumulative overlap and weighted signal strength features further comprises:
generating coverage overlap matrix for each cell of the geographic area of interest; and
summing the combined overlap associated with each of the cells.

6. The method of claim 1, wherein generating the energy consumption predictive model further comprises:
combining a group of cell-specific energy consumption predictive models into a single model.

7. The method of claim 1, wherein the signal strength measurements and the signal strength values include Reference Signal Received Power (RSRP) values.

8. The method of claim 1, wherein the service requirements include:
a maximum call drop rate, and
a minimum throughput measurement.

9. The method of claim 1, wherein the energy consumption predictive model includes features of different RAN key performance indicators (KPIs) weighted by importance of each features' impact to energy consumption.

10. A computing device, comprising:
a processor configured to:
obtain field data of user equipment (UE) devices for a group of cells covering a geographic area of interest during a time interval, wherein the field data includes signal strength measurements;
compute cell boundaries for each cell of the group of cells based on the field data;
predict signal strength values inside each of the cell boundaries for a future time period;
compute a cumulative overlap feature and a weighted signal strength feature within the geographic area of interest for each cell of the group of cells during the future time period;
generate an energy consumption predictive model that applies the cumulative overlap feature and the weighted signal strength feature for the future time period; and
determine, based on the energy consumption predictive model, first cell boundaries that correspond to a reduced energy consumption needed to meet service requirements during the future time period.

11. The computing device of claim 10, wherein the processor is further configured to:
update configuration parameters for each cell of the group of cells to achieve the first cell boundaries during the future time period.

12. The computing device of claim 10, wherein the field data excludes measurement reports with signal strength measurements below an operational threshold.

13. The computing device of claim 10, wherein, when computing the cell boundaries, the processor is further configured to:
select a subset of cell clusters for analysis based on projected activity levels during the future time period;
define grid segments for the geographic area of interest;
associate signal strength measurement values with a grid segment and a cell of the subset; and
apply a machine learning algorithm to compute a boundary for each cell of the subset based on the associated signal strength measurement values and grid segment.

14. The computing device of claim 10, wherein, when computing the cumulative overlap and weighted signal strength features, the processor is further configured to compute on or more of:
a Cumulative Partial Overlap Area (CPOA),
a Cumulative Overlap Area (COA),
a Partial Overlap Area Weighted Signal (POAWS), or
an Overlap Area Weighted Signal (OAWS).

15. The computing device of claim 10, wherein, when generating the energy consumption predictive model, the processor is further configured to:
combine a group of cell-specific energy consumption predictive models into a single model.

16. The computing device of claim 10, wherein the signal strength measurements and the signal strength values include Reference Signal Received Power (RSRP) values.

17. The computing device of claim 10, wherein the service requirements include:
a maximum call drop rate, and
a minimum throughput measurement.

18. A non-transitory computer-readable medium storing instructions, which are executable by one or more processors, for:
obtaining, by a computing device, field data of user equipment (UE) devices for a group of cells covering a geographic area of interest during a time interval, wherein the field data includes signal strength measurements;
computing cell boundaries for each cell of the group of cells based on the field data;
predicting signal strength values inside each of the cell boundaries for a future period;
computing a cumulative overlap feature and a weighted signal strength feature within the geographic area of interest for each cell of the group of cells during the future time period;
generating an energy consumption predictive model that applies the cumulative overlap feature and the weighted signal strength feature for the future time period; and
determining, based on the energy consumption predictive model, first cell boundaries that correspond to a reduced energy consumption needed to meet service requirements during the future time period.

19. The non-transitory computer-readable medium of claim 18, wherein instructions for computing the cell boundaries further comprise instructions for:

selecting a subset of cell clusters for analysis based on based on projected activity levels during the future time period;

defining grid segments for the geographic area of interest;

associating signal strength measurement values with a grid segment and a cell of the subset; and applying a machine learning algorithm to compute a boundary for each cell of the subset based on the associated signal strength measurement values and grid segment.

20. The non-transitory computer-readable medium of claim 18, further comprising instructions for:

updating configuration parameters for each cell of the group of cells to achieve the first cell boundaries during the future time period.

\* \* \* \* \*